(12) United States Patent
McElroy

(10) Patent No.: US 6,176,024 B1
(45) Date of Patent: Jan. 23, 2001

(54) NOZZLE STRUCTURE FOR BLOWER ASSEMBLY

(75) Inventor: Christopher Patrick McElroy, Glendale, AZ (US)

(73) Assignee: Proto-Vest, Inc., Glendale, AZ (US)

( * ) Notice: Under 35 U.S.C. 154(b), the term of this patent shall be extended for 0 days.

(21) Appl. No.: 09/526,820

(22) Filed: Mar. 16, 2000

(51) Int. Cl.⁷ .................................................... F26B 19/00
(52) U.S. Cl. ............................... 34/666; 34/233; 15/316.1
(58) Field of Search .............................. 34/201, 233, 666, 34/510, 541, 558, 566, 585; 15/312.1, 316.1, 405

(56) References Cited

U.S. PATENT DOCUMENTS

| 2,663,951 | * | 12/1953 | Kennison | 34/233 |
| 4,457,079 | | 7/1984 | Jodrey et al. | 34/105 |
| 4,621,439 | | 11/1986 | Maw-Chyi | 34/92 |
| 4,817,301 | | 4/1989 | Belanger et al. | 34/243 |
| 4,949,423 | * | 8/1990 | Larson et al. | 15/316.1 |
| 4,969,272 | * | 11/1990 | Schleeter et al. | 34/666 |
| 4,977,689 | * | 12/1990 | Belanger et al. | 34/666 |
| 4,979,316 | * | 12/1990 | Belanger et al. | 34/666 |
| 5,553,346 | * | 9/1996 | McElroy | 15/316.1 |
| 5,709,039 | | 1/1998 | Jones | 34/558 |
| 5,749,161 | | 5/1998 | Jones | 34/541 |
| 5,749,162 | | 5/1998 | Jones | 34/566 |
| 5,822,878 | | 10/1998 | Jones | 34/585 |
| 5,901,461 | | 5/1999 | McElroy et al. | 34/233 |

* cited by examiner

Primary Examiner—Pamela Wilson
(74) Attorney, Agent, or Firm—Howard & Howard

(57) ABSTRACT

A plurality of bags (16), each of a substantially rectangular cross-section defined by spaced and parallel bag panels (18) interconnected by shorter sides (20), have inlets respectively connected to a support plenum (12) and extend to a distal end (22). An elongated nozzle (24) extends across each bag (16) at the distal end (22) between the sides (20) and converges from the bag panels (18) to a nozzle opening (26) for directing air toward the object. The assembly is characterized by a plurality of nozzle gussets (32) each including two layers (34) of flexible material suspended between the first and second nozzle panels (30) for bulging away from one another and toward the next adjacent nozzle gusset. Consequently, the spaced layers (34) of next adjacent nozzle gussets (32) bulge toward one another in response to air flow through the nozzle (24) to create a restriction and increased velocity of the air flow.

11 Claims, 3 Drawing Sheets

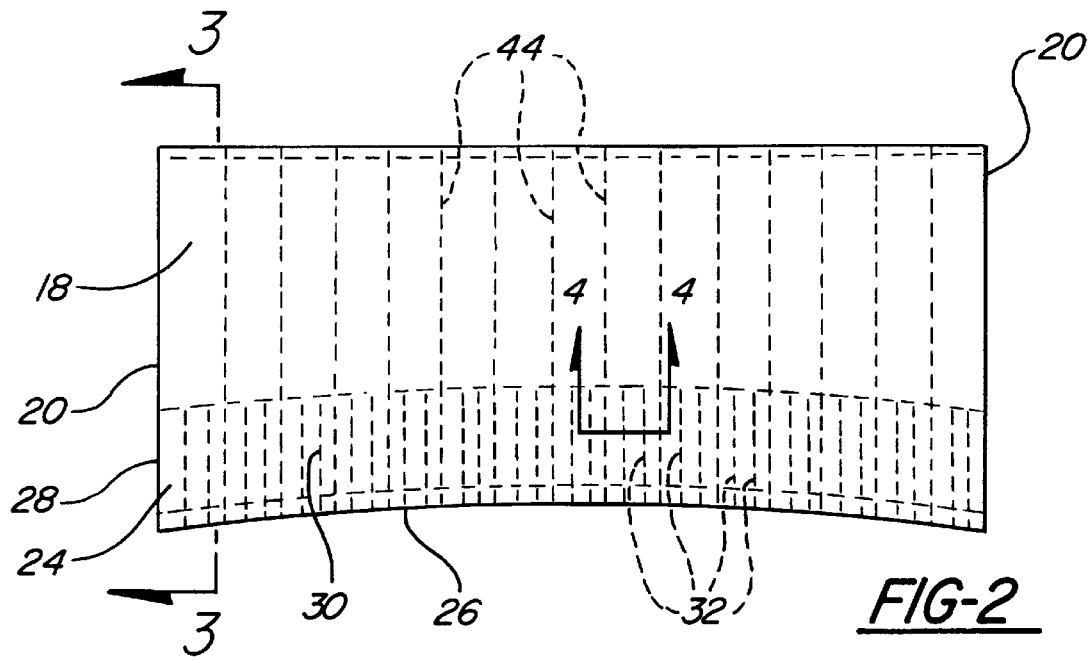
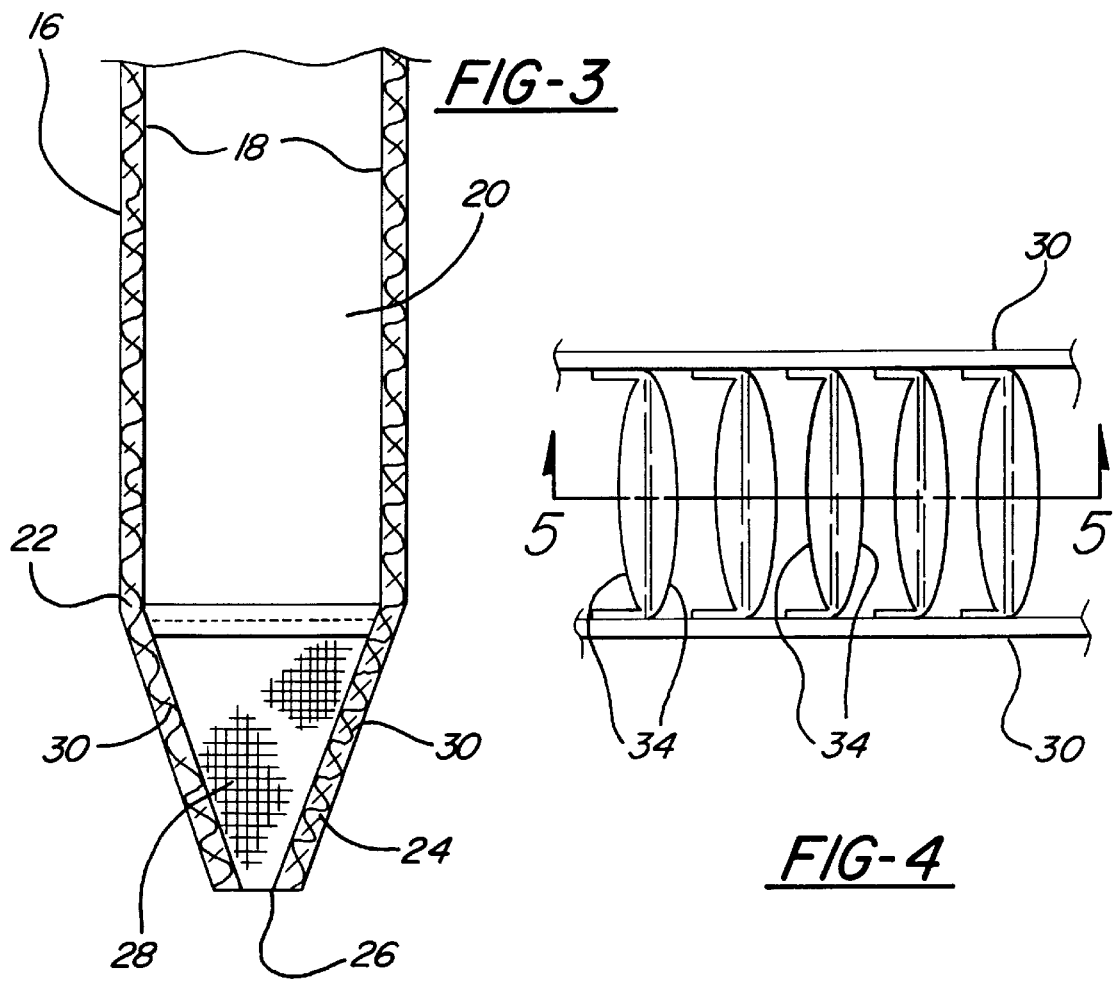

NOZZLE STRUCTURE FOR BLOWER ASSEMBLY

BACKGROUND OF THE INVENTION

1. Field of the Invention

An assembly for blowing liquids from the surface of an object and, more specifically, to an assembly for removing rinse water from a vehicle in a car wash.

2. Description of the Prior Art

Such assemblies are well known and are available in various technological philosophies. One such philosophy is based upon a flexible bag of rectangular cross section. A support plenum directs air to a plurality of bags each of a substantially rectangular cross-section which is defined by spaced bag panels interconnected by shorter sides. Each bag has an inlet connected to the support plenum and extends to a distal end. An elongated nozzle extends across the distal end of the bag between the sides and converges from the bag panels to a nozzle opening for directing air toward the object. The nozzle includes ends and first and second nozzle panels extending from the bag panels to the nozzle opening and across the bag between the ends thereof The nozzle includes a plurality of nozzle gussets connected to and extending between the first and second nozzle panels and spaced from one another across the nozzle. An assembly of this type is disclosed in U.S. Pat. No. 5,553,346 which issued Sep. 10, 1996 to McElroy et al., including the inventor named herein.

These systems have proven to operate very satisfactorily; yet the quest remains to increase the water removing capacity for any given amount of air being distributed through the plenum chamber.

SUMMARY OF THE INVENTION AND ADVANTAGES

An assembly for blowing liquids from the surface of an object comprising a support plenum for directing air therethrough and at least one bag of substantially rectangular cross-section defined by spaced bag panels interconnected by shorter sides and having an inlet connected to the support plenum and extending to a distal end. An elongated nozzle extends across the bag at the distal end between the sides and converges from the bag panels to a nozzle opening for directing air toward the object. The nozzle includes ends and first and second nozzle panels extending from the bag panels to the opening and across the bag between the ends and a plurality of nozzle gussets connected to and extending between the first and second nozzle panels and spaced from one another across the nozzle. The assembly is characterized by each of the nozzle gussets including two layers of flexible material suspended between the first and second nozzle panels for bulging away from one another and toward the next adjacent nozzle gusset.

Accordingly, the spaced layers of next adjacent nozzle gussets bulge toward one another in response to air flow through the nozzle to create a restriction and increased velocity of the air flow, thereby increasing the water removing capacity for any given amount of air being distributed through the plenum chamber.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a plan view of the overhead bag;

FIG. 3 is a cross sectional view taken along line 3—3 of FIG. 2;

FIG. 4 is a cross sectional view taken along line 4—4 of FIG. 2;

DETAILED DESCRIPTION OF THE PREFERRED EMBODIMENT

Figure 1:
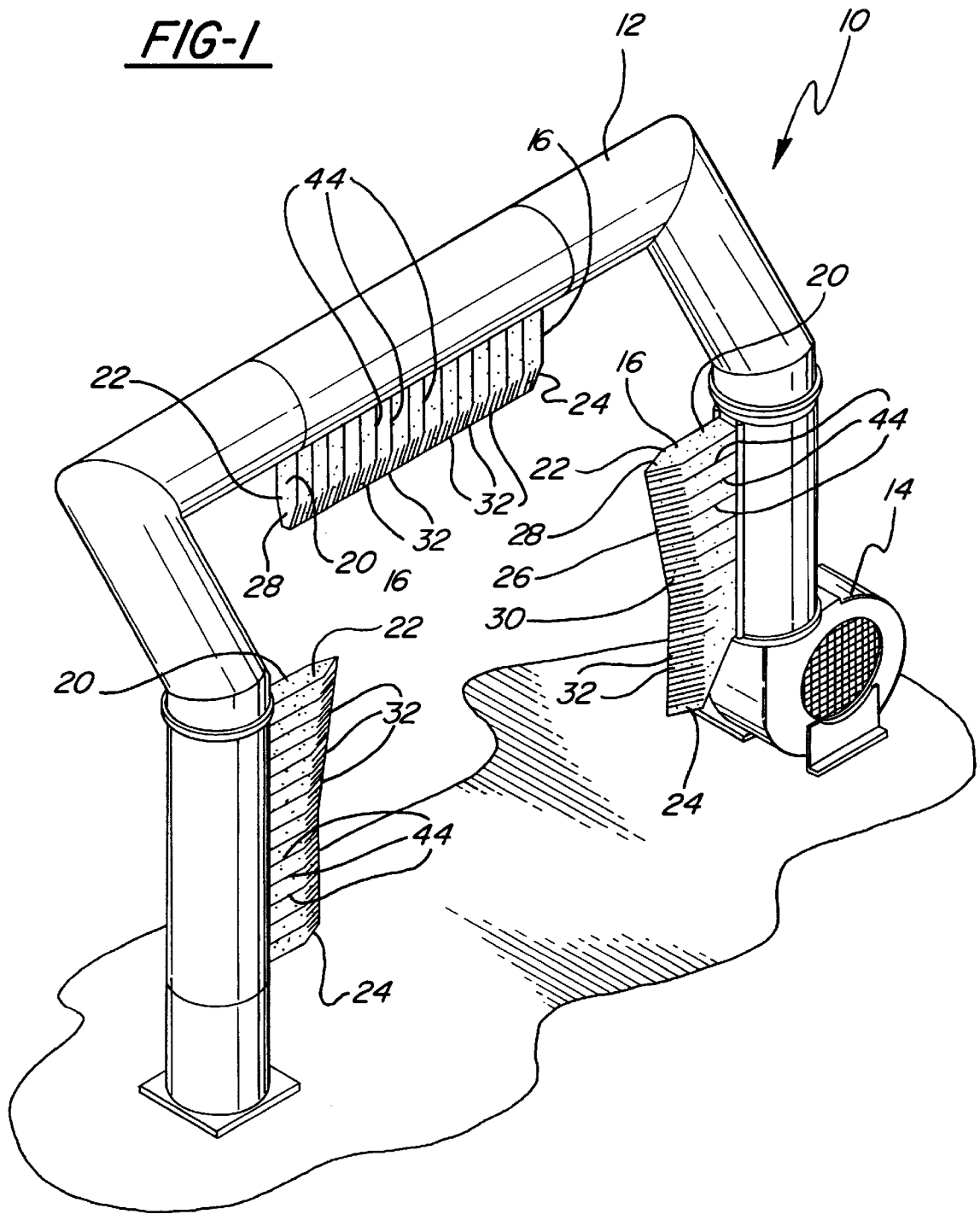
FIG. 1 is a perspective view of an assembly incorporating the subject invention.

Referring to the Figures, wherein like numerals indicate like or corresponding parts throughout the several views, an assembly for blowing liquids from the surface of an object such a vehicle is generally shown at 10.

The assembly 10 includes a support plenum 12 for directing air therethrough. A blower 14 directs air from the ambient environment to the plenum 12 for distribution. A plurality of bags 16, each of a substantially rectangular cross-section defined by spaced and parallel bag panels 18 interconnected by shorter sides 20, have inlets respectively connected to the support plenum 12 and extend to a distal end 22.

An elongated nozzle 24 extends across each bag 16 at the distal end 22 between the sides 20 and converges from the bag panels 18 to a nozzle opening 26 for directing air toward the object, e.g., a vehicle in car wash. The nozzle 24 includes nozzle ends 28 and first and second nozzle panels 30 extending from the bag panels 18 to the nozzle opening 26 and across the bag 16 between the nozzle ends 28. The nozzle 24 includes a plurality of nozzle gussets 32 connected to and extending between the first and second nozzle panels 30 and spaced from one another across the nozzle 24.

Figure 5:
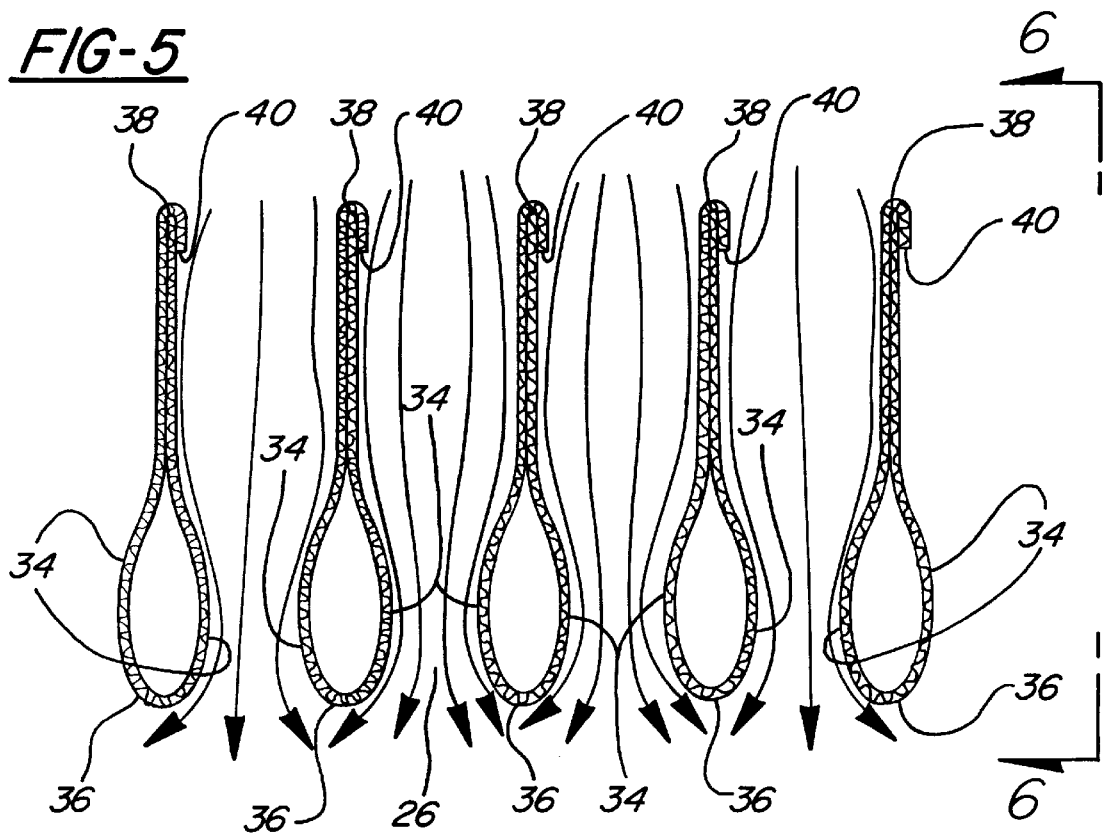
FIG. 5 is a cross sectional view taken along line 5—5 of FIG. 4.

The assembly is characterized by each of the nozzle gussets 32 including two layers 34 of flexible material suspended between the first and second nozzle panels 30 for bulging away from one another and toward the next adjacent nozzle gusset, as shown in FIG. 5. Consequently, the spaced layers 34 of next adjacent nozzle gussets 32 bulge toward one another in response to air flow through the nozzle 24 to create a restriction and increased velocity of the air flow. This increased velocity increases the energy of the air exiting the nozzle opening 26 thereby increasing the capacity to remove water from an object such as a vehicle.

The two layers 34 of each nozzle gusset 32 are connected together adjacent the distal end 22 of the bag 16 in the direction between the first and second nozzle panels 30. Additionally, the two layers 34 of each nozzle gusset are connected together adjacent the nozzle opening 26 in the direction between the first and second nozzle panels 30. More specifically, each of the nozzle gussets 32 comprises a sheet of flexible material having an initial shape of an hourglass with a waist. The two layers 34 of each nozzle gusset are therefore connected together adjacent the nozzle opening 26 by a fold 36 at the waist with the two layers 34 extending to open ends 38 and 40 at the distal end 22 of the bag panels 18. A seam 42 extends from each of the open ends 38 and 40 of the fold 36 and about the periphery of the layers 34 to hold the layers 34 together. The seam 42 may be sewn or may be an adhesive and it may be in one or more rows. The two layers 34 have a greater dimension than the distance between the nozzle panels 30 for allowing the bulging as illustrated in FIG. 5.

Figure 6:
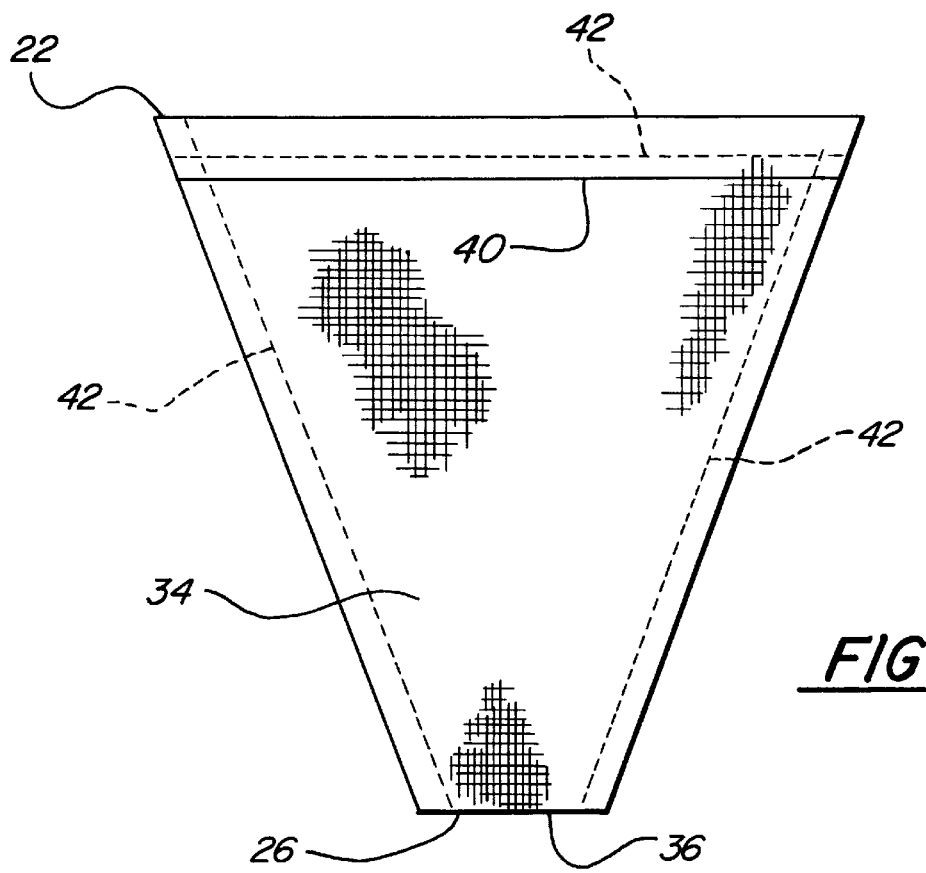
FIG. 6 is a cross sectional view taken along line 6—6 of FIG. 5.

The open end 40 of a first of the layers 34 is folded over the open end 38 of the second or other of the layers 34 and the seam 42 extends through the folded over open end 40, as shown in FIG. 6. In addition, the assembly includes similar seams connecting the nozzle gussets 32 to the nozzle panels 30 between the open ends 38 and 40 and the nozzle opening 26.

As alluded to above, the nozzle 24 comprises a flexible material and the nozzle 24 and the bag 16 comprise the same flexible material. The flexible material is a canvas-like material. For simplicity, each of the bag panels 18 and one of the nozzle panels 30 is defined by a single sheet of flexible material extending between the inlet of the bag 16 and the nozzle opening 26. A plurality of bag gussets 44 interconnect the bag panels 18 for maintaining each bag 16 in the substantially rectangular cross section. In a similar fashion, the nozzle gussets 32 maintain the first and second panels 30 of the nozzle 28 in a substantially rectangular cross-sections taken transversely anywhere between distal end 22 of the bag panels 18 and the nozzle opening 26.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly for blowing liquids from the surface of an object, said assembly comprising:

a support plenum (12) for directing air therethrough;

at least one bag (16) of substantially rectangular cross-section defined by spaced bag panels (18) interconnected by shorter sides (20) and having an inlet connected to said support plenum (12) and extending to a distal end (22);

an elongated nozzle (24) extending across said bag (16) at said distal end (22) between said sides (20) and converging from said bag panels (18) to a nozzle opening (26) for directing air toward the object, said nozzle (24) including ends (28) and first and second nozzle panels (30) extending from said bag panels (18) to said nozzle opening (26) and across said bag (16) between said nozzle ends (28), said nozzle (24) including a plurality of nozzle gussets (32) connected to and extending between said first and second nozzle panels (30) and spaced from one another across said nozzle (24);

said assembly characterized by each of said nozzle gussets (32) including two layers (34) of flexible material suspended between said first and second nozzle panels (30) for bulging away from one another and toward the next adjacent nozzle gusset.

2. An assembly as set forth in claim 1 wherein said two layers (34) of each nozzle gusset are connected together adjacent said distal end (22) of said bag (16) in the direction between said first and second nozzle panels (30).

3. An assembly as set forth in claim 2 wherein said two layers (34) of each nozzle gusset are connected together adjacent said nozzle opening (26) in the direction between said first and second nozzle panels (30).

4. An assembly as set forth in claim 3 wherein each of said nozzle gussets (32) comprises a sheet of flexible material having an initial shape of an hourglass with a waist said two layers (34) of each nozzle gusset being connected together adjacent said nozzle opening (26) by a fold (36) at said waist with said two layers (34) extending to open ends (38 and 40) at said distal end (22) of said bag panels (18).

5. An assembly as set forth in claim 4 including a seam (42) extending from each of said ends of said fold (36) and about the periphery of said layers (34) to hold said layers (34) together.

6. An assembly as set forth in claim 5 wherein said open end (40) of a first of said layers (34) is folded over the open end (38) of the second of said layers (34) and said seam (42) extends through said folded over open end (40).

7. An assembly as set forth in claim 6 including seams connecting said nozzle gussets (32) to said nozzle panels (30) between said open ends (38 and 40) and said nozzle opening (26).

8. An assembly as set forth in claim 7 wherein said nozzle (24) comprises a flexible material.

9. An assembly as set forth in claim 8 wherein said nozzle (24) and said bag (16) comprise the same flexible material.

10. An assembly as set forth in claim 9 wherein each of said bag panels (18) and one of said nozzle panels (30) is defined by a single sheet of flexible material extending between said inlet of said bag (16) and said nozzle opening (26).

11. An assembly as set forth in claim 10 including a plurality of bag gussets (44) connected between said bag panels (18) for maintaining said bag (16) in said substantially rectangular cross section.

* * * * *